FIG. 1

INVENTORS
JOSEPH L. McKIBBEN
GERALD G. OHLSEN
RALPH R. STEVENS, JR.
BY
ATTORNEY

FIG. 6

INVENTORS
JOSEPH L. McKIBBEN
GERALD G. OHLSEN
RALPH R. STEVENS, JR.
ATTORNEY

Sept. 9, 1969  J. L. McKIBBEN ET AL  3,466,442
APPARATUS FOR THE SELECTION OF METASTABLE ATOMS
HAVING A PREDETERMINED POLARIZATION
Filed April 19, 1967  11 Sheets-Sheet 7

FIG. 7

INVENTORS
JOSEPH L. McKIBBEN
GERALD G. OHLSEN
RALPH R. STEVENS, JR.
BY

ATTORNEY

Sept. 9, 1969    J. L. McKIBBEN ET AL    3,466,442
APPARATUS FOR THE SELECTION OF METASTABLE ATOMS
HAVING A PREDETERMINED POLARIZATION
Filed April 19, 1967                    11 Sheets-Sheet 8

INVENTORS
JOSEPH L. McKIBBEN, GERALD G. OHLSEN,
RALPH R. STEVENS, JR.
BY
ATTORNEY

FIG. 10

INVENTORS
JOSEPH L. McKIBBEN
GERALD G. OHLSEN
RALPH R. STEVENS,
ATTORNEY

FIG. 11

INVENTORS
JOSEPH L. McKIBBEN
GERALD G. OHLSEN
RALPH R. STEVENS JR.
BY
ATTORNEY

United States Patent Office 3,466,442
Patented Sept. 9, 1969

3,466,442
APPARATUS FOR THE SELECTION OF META-
STABLE ATOMS HAVING A PREDETERMINED
POLARIZATION
Joseph L. McKibben, 113 Aztec Ave., White Rock; Gerald
G. Ohlsen, 4221 Trinity; and Ralph R. Stevens, Jr., 2800
Walnut, all of Los Alamos, N. Mex. 85744
Filed Apr. 19, 1967, Ser. No. 632,059
Int. Cl. H01j *37/00, 39/00;* G01n *23/00*
U.S. Cl. 250—84                                          5 Claims

ABSTRACT OF THE DISCLOSURE

Metastable particles having a particular spin state are selected by exposing them to a combination of magnetic, radio-frequency and static or low-frequency fields applied in a predetermined direction, frequency and magnitude. The strength of the magnetic field corresponds to the energy level crossings for the group of particles and the radio-frequency field has a frequency corresponding to the difference between the alpha and beta energy of the particles so that those atoms having the desired polarization are retained, and those of a different polarization are quenched to ground state.

---

Our invention relates to a new and useful selective quenching mechanism and process for selecting from a beam of metastable hydrogen atoms or hydrogen-like ions, that is, those atoms or ions having one electron, those having a particular polarization.

In recent years mechanisms and processess have been discovered which produce particles having an excitation energy higher than that of the ground state and having a lifetime sufficiently long to be useful. Such particles are referred to as being "metastable." Quite recently a method was found which can produce a copious beam of metastable hydrogen atoms, i.e., hydrogen atoms in the $2S_{1/2}$ state. Until our invention, the art has been confronted with the problem of polarizing these particles so that there would be a preferential population of certain spin states of the particles. Such polarization is useful in many different applications, as for example the study of nuclear structure when the polarized particles are accelerated.

It is well known that Stark field quenching in a suitable magnetic field will produce a metastable beam with 100% electronic polarization and zero nuclear polarization. There are also some methods known to the prior art for obtaining partially polarized nuclei from metastable particles having electronic polarization. These methods were developed in connection with known polarized ion sources, but they have been found to be inefficient and they are not adaptable to select any particular spin state desired.

Thus, the primary problem confronting the art prior to our invention was the efficient production of particles with both nuclear and electronic polarization or nuclear polarization or a selected mixture of nuclear electronic polarization.

For some time the art has been aware of the principle that the combined application of a magnetic field, a radio frequency field and a DC or low frequency electric field to metastable atoms could selectively quench atoms of a particular nuclear and electronic polarization when the term "low frequency field" is used herein, it refers to the zero frequency or static field as well as to a field of some measurable frequency. Until our invention, however, the theory underlying the production of polarized atoms was not sufficiently complete for practical applications, nor was there a practical method or device to efficiently produce atoms having a predetermined polarization. Up to the time of the present invention, no parameters for the RF field or the DC field had been found that would be useful in practical application. Furthermore, no means was available to provide a selective process for independent control of the electronic and nuclear polarization in the polarized metastable atom beam. Moreover, we have discovered several important improvements over the simplest practical configuration. Until our invention no device or process was available to operate on a beam of atoms or ions having a large cross section. The prior art teaches no means for slowly building up or reducing the fields involved to prevent unnecessary quenching caused by abrupt changes in the fields at entrances and exits.

It is therefore an object of this invention to provide a mechanism and process that will efficiently select metastable atoms or ions with a particular polarization and provide independent control over the electronic and nuclear polarization of those metastable atoms selected.

It is a further object of our invention to provide a mechanism and process to operate on any size beam of metastable particles to enhance the transmission of particles having a desired polarization, quench to ground state particles having an undesirable polarization, and to provide particles having either nuclear or electronic polarization or a combination of both as desired.

It is a further object of this invention to provide a device for selecting metastable atoms or ions of a desired polarization from a beam of such atoms or ions by the use of a combination of a magnetic field, a radio frequency electric field, and a static or low frequency electric field within a radio frequency cavity or other means for containing radio frequency fields, which fields are applied to the beam in a predetermined direction, frequency and magnitude. It is a further object of this invention to provide a device as stated above wherein the various fields are built up and reduced slowly at its entrance and exit so that atoms or ions having desirable polarization are not quenched to the ground state unnecessarily.

Our invention consists of an apparatus and process for exposing metastable particles or a beam of such particles to a predetermined radio frequency (RF) electric field in combination with a static magnetic field (H) and a static (DC) or low frequency electric field. The three fields are applied to the particles in a predetermined direction, frequency and magnitude within a radio frequency cavity to quench all particles having polarization other than that desired so that those particles emerging at the output side of the cavity have the desired polarization.

Other objects and advantages of our invention will appear as the same become better understood by the following description:

A brief description of the theory upon which our mechanisms and process are based will aid in the understanding of the actual invention:

The $n=2$ states of atomic hydrogen lie approximately 10. 15 ev. above the ground state. The $2P_{3/2}$ and $2P_{1/2}$ states are split, by spin orbit coupling, by an energy corresponding to about 10,968 mHz. (megacycles per second) while the $2P_{1/2}$ and $2S_{1/2}$ states are separated by an energy corresponding to about 1058 mHz. (the Lamb Shift). In a magnetic field the various magnetic substates become nondegenerable. The $2P_{3/2}$ magnetic substates are usually referred to by the following notation: $a$ for $m_J=3/2$), $b$ (for $m_J=1/2$), $c$ for $m_J=-1/2$). and $d$ (for $m_J=-3/2$). Similarly, the $2P_{1/2}$ magnetic substates are usually referred to as $e$ (for $m_J=1/2$) and $f$ (for $m_J=-1/2$) while the $2S_{1/2}$ magnetic substates are usually referred to as alpha (for $m_J=1/2$) and beta (for $m_J=-1/2$).

Since the nucleus also has a spin and magnetic moment, a complete description of a state must also specify the nuclear spin magnetic quantum number $m_I$, which may have values $\pm 1/2$ for hydrogen or tritium atoms, and values, 1, 0, or $-1$ for deuterium atoms. The magnetic field strength of interest for the present devices and process dictates the use of "large field" quantum numbers.

Figure 12:
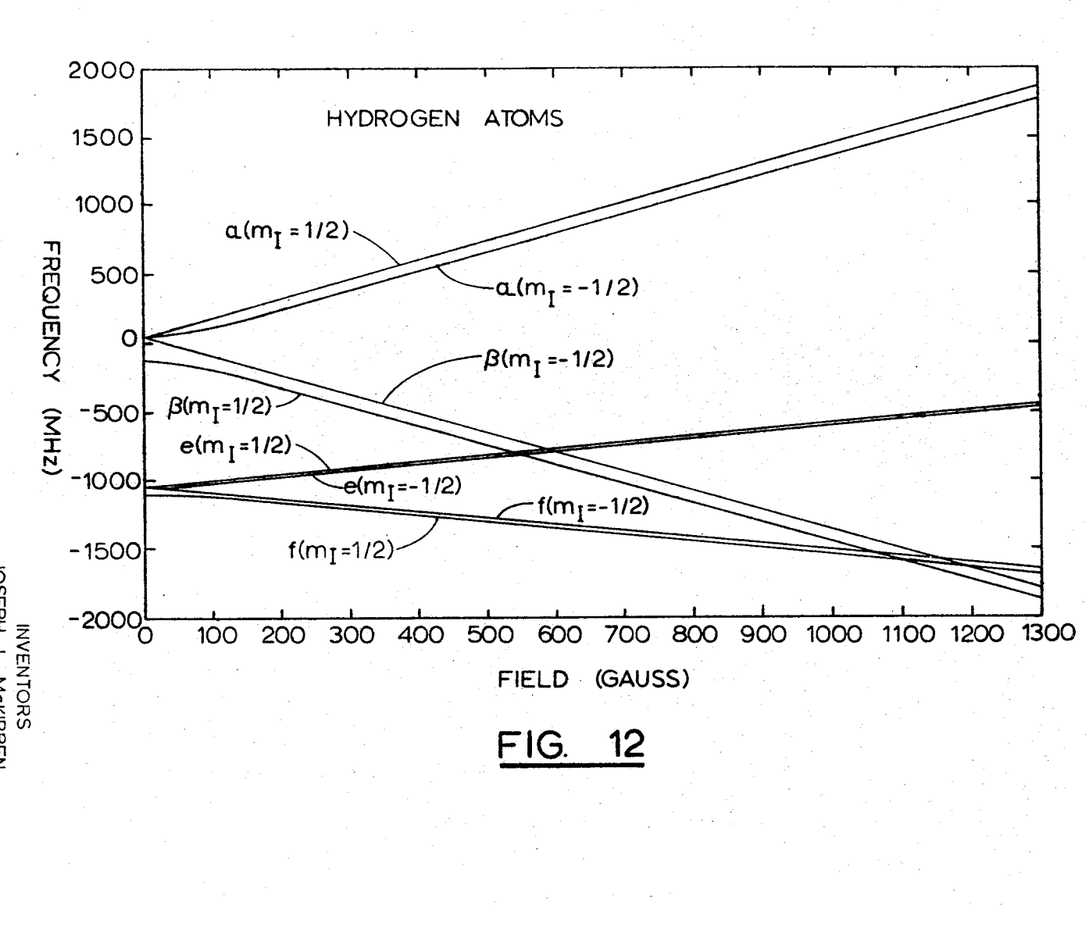
FIG. 12 shows a typical Breit-Rabi diagram.

In FIG. 12, the magnetic field strength dependence of the respective energies of the alpha, beta, $e$, and $f$ states, are shown for hydrogen atoms. A similar diagram for deuterium atoms would show 3 lines rather than 2 for each of the states alpha, beta, $e$, and $f$. Such a diagram is often refered to as a Breit-Rabi diagram. The remaining energy levels of the hydrogen atom play an insignificant role in the present application.

The alpha and beta states are metastable with a theoretical lifetime of about $1/7$ second while the $e$ and $f$ states have a lifetime of about $1.6 \times 10^{-9}$ sec.

At the magnetic fields of present interest, the electronic and nuclear spins are decoupled sufficiently that, we may consider that only one or the other of the spin quantum numbers may be altered in a single transition. Thus we may fix our attention on a particular nuclear spin direction, i.e., nuclear magnetic quantum number. The discussion to follow is independent of which nuclear spin direction we have in mind and of whether we are referring to hydrogen, deuterium, or tritium atoms.

Figure 7:
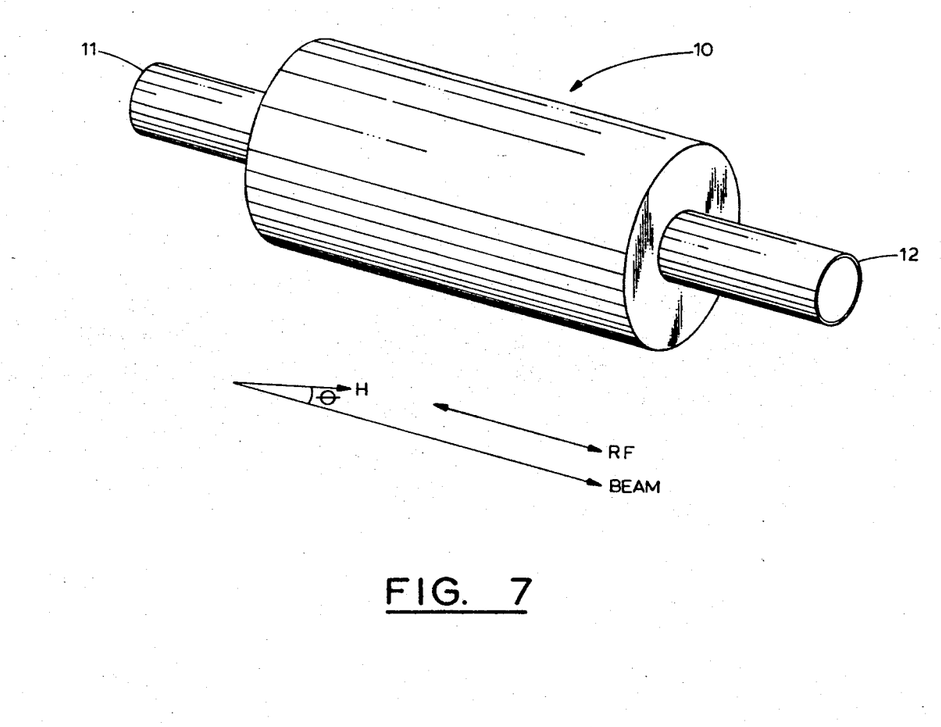
FIG. 7 is an isometric view of a fourth embodiment of our invention.

The process consists of inducing, simultaneously, transitions between the alpha and the $e$ states and between the beta and the $e$ state in a magnetic field sufficiently near the beta-$e$ "crossing" as shown in FIG. 7 or of inducing, simultaneously, transitions between the alpha and the $f$ states and between the beta and the $f$ states in a magnetic field sufficiently near the beta-$f$ "crossing." To "connect" the alpha to the $e$ level a longitudinal RF electric field is required. To "connect" the beta to the $e$ level a transverse static or low frequency electric field is required. This description applies at the beta-$e$ crossing. At the beta-$f$ crossing the fields must be interchanged.

When the frequency of the RF electric field corresponds as nearly as practicable to the alpha-beta energy separation and corresponds sufficiently well to the alpha-$e$ (or alpha-$f$) energy separation, i.e., the magnetic field value is sufficiently near that which corresponds to the beta-$e$ (or beta-$f$) "crossing," an equilibrium alpha and beta population is established. Assuming that an unpolarized metastable beam enters the cavity, i.e., equal probability for a particular atom to be in its alpha or in its beta state, the ratio of alpha state probability to beta state probability is related in a known way to the ratio of the DC to RF electric field strength at the exit to the cavity. Thus, by reducing the RF field slowly to zero while holding the DC field nearly constant, a beam of atoms all in their alpha states will emerge from the cavity if we near the beta-$e$ crossing. A beam of atoms all in their beta states will emerge if we are sufficiently near the beta-$f$ crossing. The opposite is true if we reduce the DC field slowly to zero while holding the RF field nearly constant. If neither the RF or DC electric field is zero at the exit the beam produced will be a coherent mixture of alpha and beta states. This corresponds to an electron spin direction tilted at some angle with respect to the magnetic field direction and precessing around that direction with the Larmor frequency.

In the application of our invention to a polarized ion source it is desirable to enhance the output of atoms in their alpha states rather than those in their beta states since the former atoms, under the magnetic field conditions of interest, are much less subject to accidental quenching by stray or motional electric fields. On the other hand, there are some applications where one would be interested in producing a pure beta beam or a coherently mixed alpha-beta beam.

In all of the above nearly 100% nuclear polarization is achieved since only a particular $m_I$ value will have an alpha-beta energy separation corresponding to the RF frequency. Atoms having other nuclear polarizations are quenched. This is only true if proper field parameters are employed, however.

We have discovered an additional advantage in "shaping" the RF to DC field strength ratio. Approximately 40–50% of the part of the beam having zero electronic polarization (with the nuclear spin magnetic quantum number being selected) will emerge as an alpha, beta, or alpha-beta electronic polarized atomic beam, (with nearly 100% nuclear polarization as discussed above). In practice one frequently has an initial beam predominantly in its alpha state with 0% nuclear polarization. A higher percentage of such an initial beam may be transmitted if the RF to DC ratio is also slowly increased at the entrance part of the cavity. For proper field shaping the guiding rule is as follows: At the entrance the RF to DC ratio should be small for an incident alpha beam or large for an incident beta beam. Similarly the RF to DC ratio at the exit should be small if an alpha polarized beam is desired, large if a beta polarized beam is desired, and intermediate if a mixture is desired.

We have discovered that in order to achieve satisfactory polarization the parameters for the magnetic field and the RF electric field must be chosen to approximately coincide with an intersection of the beta-$e$ or beta-$f$ energy lines shown in FIG. 12. A certain deviation is possible, but only within a limited range of approximately 100 gauss. The particular intersection chosen will determine the directions of the various fields necessary to achieve polarization.

If the beta-$e$ crossing is used the RF electrical field must correspond to the direction of the magnetic field, while the DC or low frequency field must be transverse thereto. A part of the magnetic field may be "bucked" by a separate electric field to reduce quenching of the atoms due to the electric field induced by the beam cutting the magnetic lines of force. The RF frequency must be chosen to correspond to the alpha-beta frequency of the particular hyperfine state being selected and the magnetic field must be chosen so that the beta and $e$ levels are near crossing. The embodiments shown in FIGS. 1–8 and 11 all pertain to working near the beta-$e$ crossing. The embodiments shown in FIGS. 9 and 10 pertain to working near the beta-$f$ crossing. This description assumes a moving beam of metastable atoms, although, except for the embodiment shown in FIG. 6 time modulation of the RF and DC fields would be equivalent thereto.

The cavity shown in FIGS. 1–4 is operating basically in the $TM_{010}$ mode with the beam of metastable atoms traveling along the longitudinal axis of RF cavity 10. The rate of variation of the RF field may be controlled by the size of the input and output openings or extension tubes on RF cavity 10, and the DC variation may be adjusted by segmenting the cavity in the manner shown in FIG. 6.

Referring now to the drawings, wherein like numbers designate like parts:

The respective orientations of the magnetic and electric fields are shown by line diagrams accompanying each figure for clarity. The following symbols are used:

H—Magnetic field
RF—Radio frequency electric field
DC—Direct current or low frequency electric field
Beam—Beam of metastable particles
E—Bucking voltage used to cancel electromotive force generated by the beam cutting the lines of magnetic force.

The term "DC" when used in this application refers either to a DC voltage or to a low frequency voltage.

We have provided a radio frequency cavity 10 having an input 11 and an output 12. Magnetic coils 15 provide a magnetic field surrounding RF cavity 10. Radio frequency cavity 10 is divided into four segments 20, 21, 22 and 23 which are adjustably supported within housing 13 by adjustable insulators 24. Inner walls 25 of RF cavity 10 are made of electrically conducting and nonmagnetic material such as copper, brass or the like. A source of radio frequency energy 30 provides radio frequency energy into cavity 10 through coaxial cable 31 and coupling loop 32 and a static or low frequency voltage is provided across any two oppositely spaced segments of cavity 10. Cavity 10 may be tuned by adjusting the adjustable insulators 24 to make it larger or smaller as needed. The cavity shown in FIGS. 1–10 is operated in the $TM_{010}$ mode. Bolts 26 may be used to fix RF cavity 10 in position. Adjustment insulators 24 and bolts 26 are insulated from housing 27 in any suitable manner. Housing 27 is supported in position by any suitable means, such as brackets 28.

It is readily apparent that the configuration RF cavity 10 is not critical in our invention so long as the RF electrical field and the DC or low frequency field are properly applied in relation to the direction of the magnetic field. Detailed information on one particular embodiment of our invention is shown in FIGS. 1–4. Several modifications of the device comprising our invention are shown in FIGS. 5–11. The devices shown in FIGS. 1–8 all employ a cylindrical RF cavity 10 operating in the $TM_{010}$ mode, although other configurations, such as spherical, rectangular or elliptical could as easily be used. In FIG. 11, a single example of an embodiment using a rectangular RF cavity 10 is shown. The embodiments shown in FIGS. 9 and 10 employ a cavity operating in the $TM_{010}$ mode.

Figure 1:
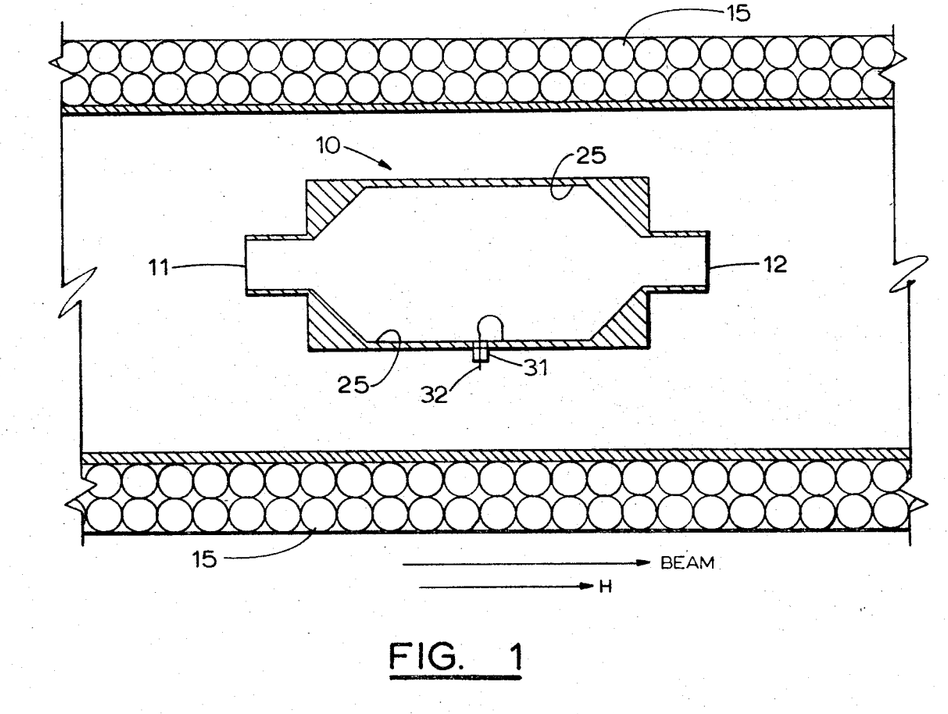
FIG. 1 is a cross sectional schematic drawing of one embodiment of our invention.
Figure 2:
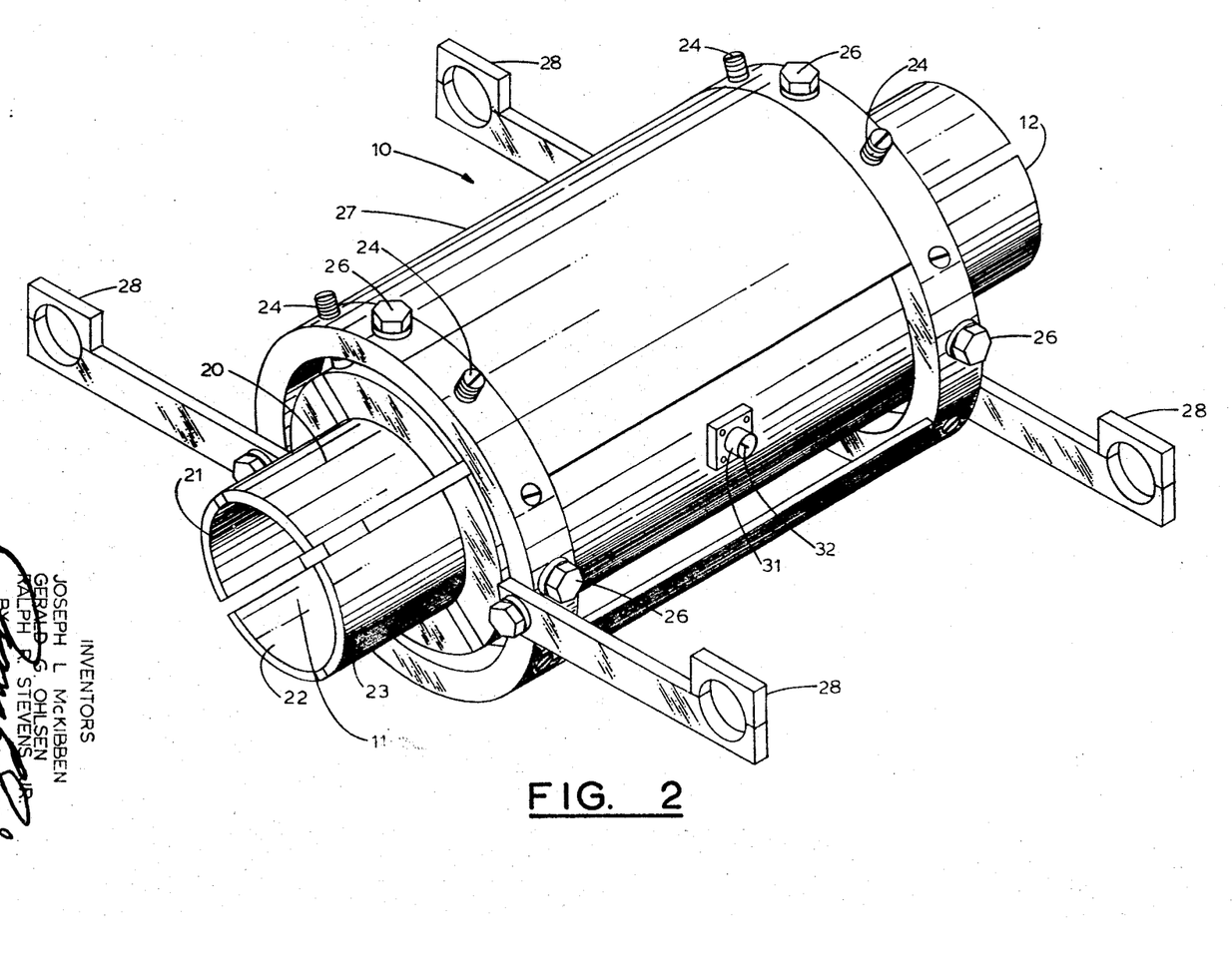
FIG. 2 is a view of the RF cavity, its housing and support brackets comprising a part of our invention.
Figure 3:
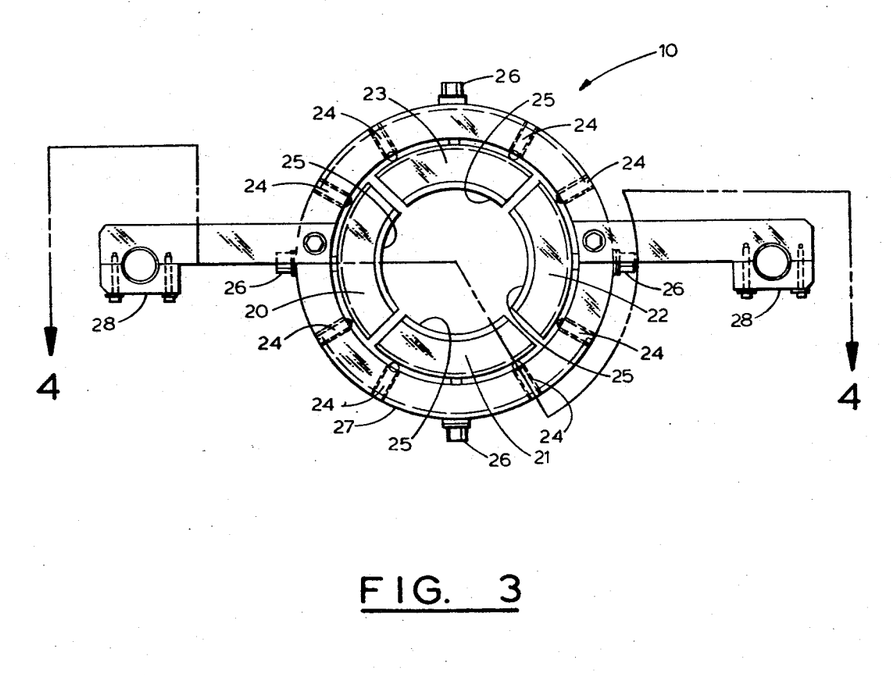
FIG. 3 is an end view of the device shown in FIG. 2.
Figure 4:
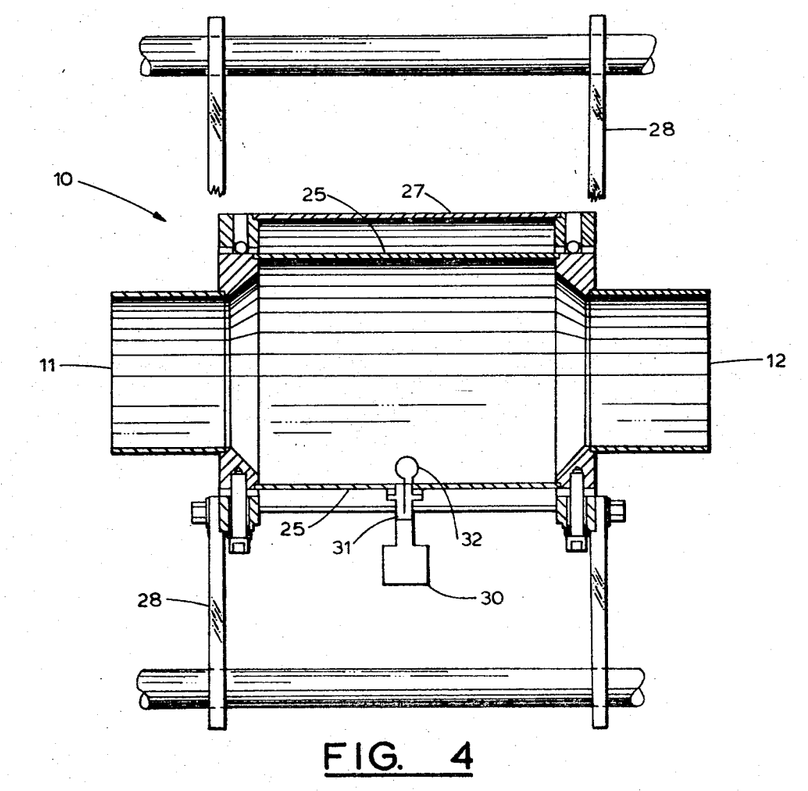
FIG. 4 is a cross sectional view of the device shown in FIG. 3 taken along lines 4—4.
Figure 5:
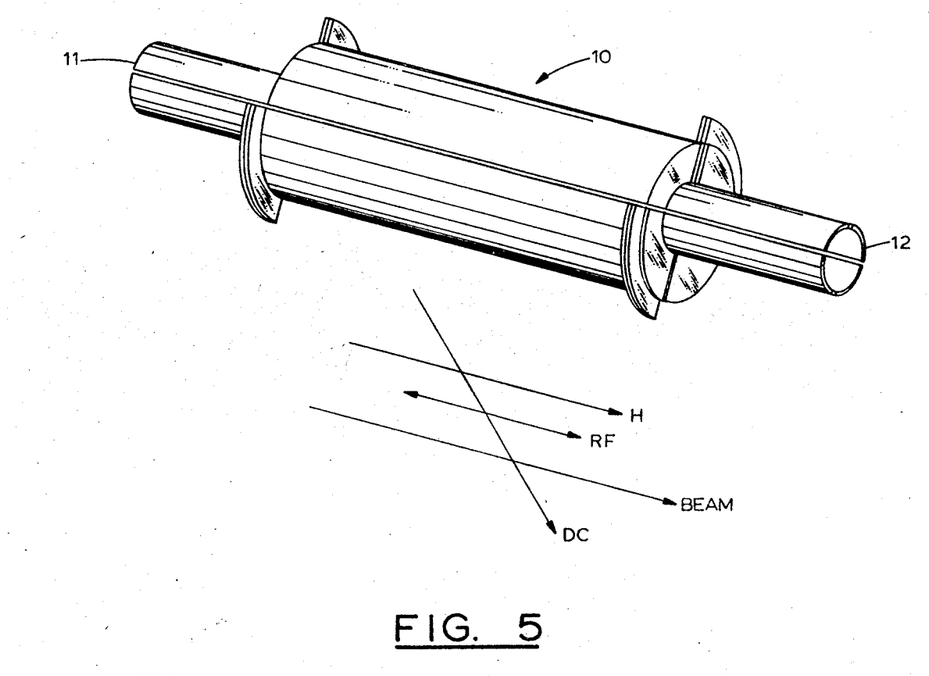
FIG. 5 is an isometric view of a second embodiment of our invention.

In FIG. 5 a device which will operate in a manner similar to that shown in FIGS. 1–4 is shown. The only difference between the two embodiments is that we have included quarter wave joints 33 and 34 to provide DC insulation between the segments so that different DC fields can be applied across the segments to provide a variable DC field over the length of the cavity 10.

A quarter wave joint such as that shown in FIG. 5 is a well-known microwave device which provides DC insulation across the joint while allowing the RF currents to pass essentially unimpeded.

Figure 6:
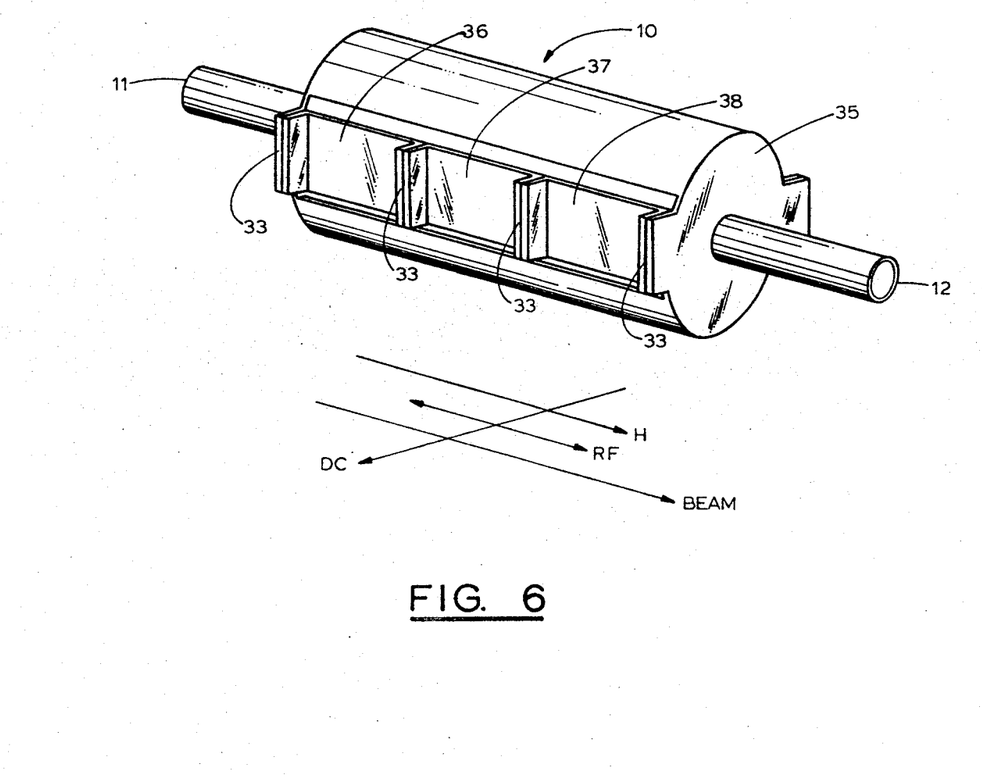
FIG. 6 is an isometric view of a third embodiment of our invention.

FIG. 6 depicts one embodiment of our invention which is useful in applications where the selection of atoms with beta electronic polarization is desired. In this embodiment the two segments of RF cavity 10 to which DC voltage is applied are divided into several parts, 35, 36, 37, 38 each separated by quarter wave length joints 33. Each segment is provided with a separate DC voltage source in a well known manner so that the electric field strength can be varied as desired along the length of RF cavity 10. It is understood that the DC voltage is applied across oppositely spaced pairs of segments located on opposite sides of RF cavity 10 even though FIG. 6 shows only one side of the cavity 10. The directions of the beam, RF field, DC field and magnetic (H) field are as shown in the line diagram in FIG. 6.

In FIG. 7 we show one embodiment of our invention wherein the DC voltage source is eliminated by the use of a component of magnetic field (H), or a supplementary magnetic field, which is perpendicular to the direction of travel of the atomic beam. In the embodiment shown in FIG. 7 the magnetic field H is at an angle $\theta$ relative to the direction of travel of the atomic beam. The effect of the atomic beam cutting the magnetic lines of force perpendicular to the direction of beam travel is to generate an equivalent motional electric field which serves the same purpose as applied DC voltage. The perpendicular component of the magnetic field may be shaped as desired within the limits of the overall magnetic field homogeneity required for the operation of our invention. The directions of the atomic beam, the RF electric field and the magnetic fields are as shown in the line diagram in FIG. 7.

Figure 8:
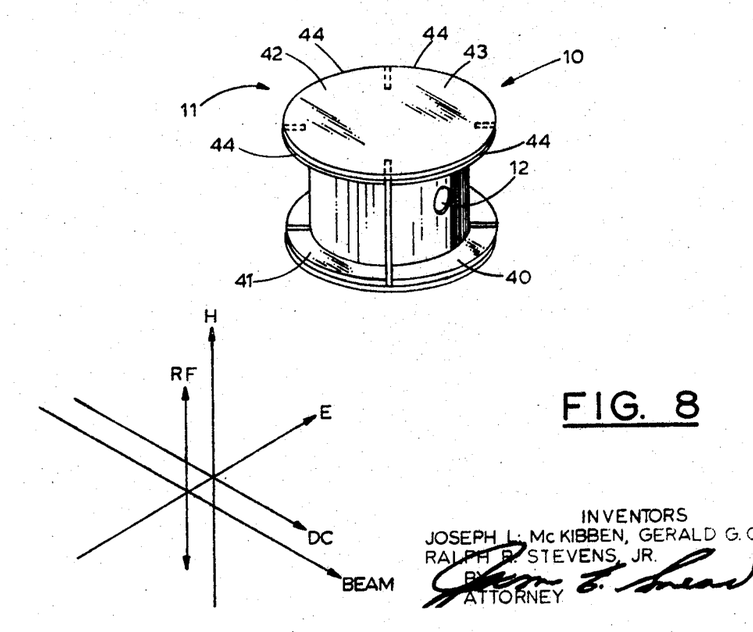
FIG. 8 is a schematic drawing of a fifth embodiment of our invention.

In the embodiment shown in FIG. 8 the RF cavity 10 is divided into segments 40, 41, 42 and 43, each of which are electrically separated by quarter wave joints 44. The DC voltage useful in our invention is applied across segments 40 and 42 while a "bucking" DC voltage (E) is applied across segments 41 and 43. The "bucking" voltage is necessary because the magnetic field H, which is applied perpendicular to the direction of travel of the atomic beam, results in an effective motional electric field which if not cancelled would tend to interfere with the atomic particles being polarized. The effect of the "bucking" electric field is to cancel the motional electric field. The DC electric field necessary for the operation of our invention may be obtained by either applying a DC voltage across segments 40 and 42 or by increasing the DC voltage across segments 41 and 43. The respective directions of the RF, magnetic, DC and motional electric fields are as shown in the line diagrams in FIG. 8.

Figure 9:
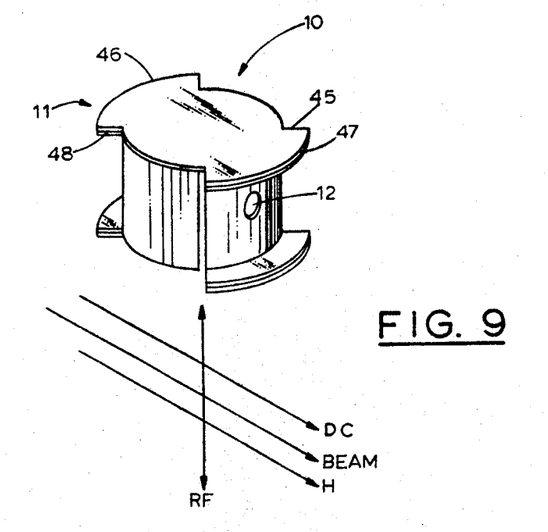
FIG. 9 is a schematic drawing of a sixth embodiment of our invention.

FIG. 9 is an embodiment of our invention which operates near the beta-$f$ crossing of the energy diagrams such as shown in FIG. 12. In this embodiment of our invention the H field is parallel to the direction of travel of the atomic beam and DC voltage is applied across segments 45 and 46 of cavity 10. Quarter wave joints 47 and 48 provide DC insulation between the segments. The respective directions of the H, RF and DC fields are as shown in the line diagram on FIG. 9.

Figure 10:
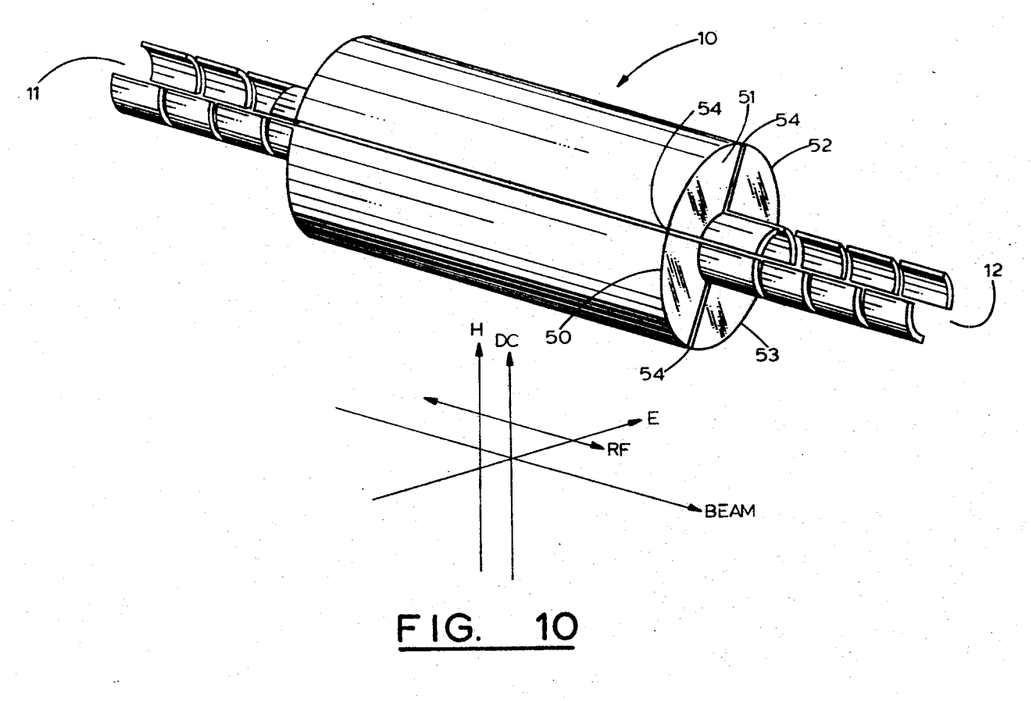
FIG. 10 is a schematic drawing of a seventh embodiment of our invention.
Figure 11:
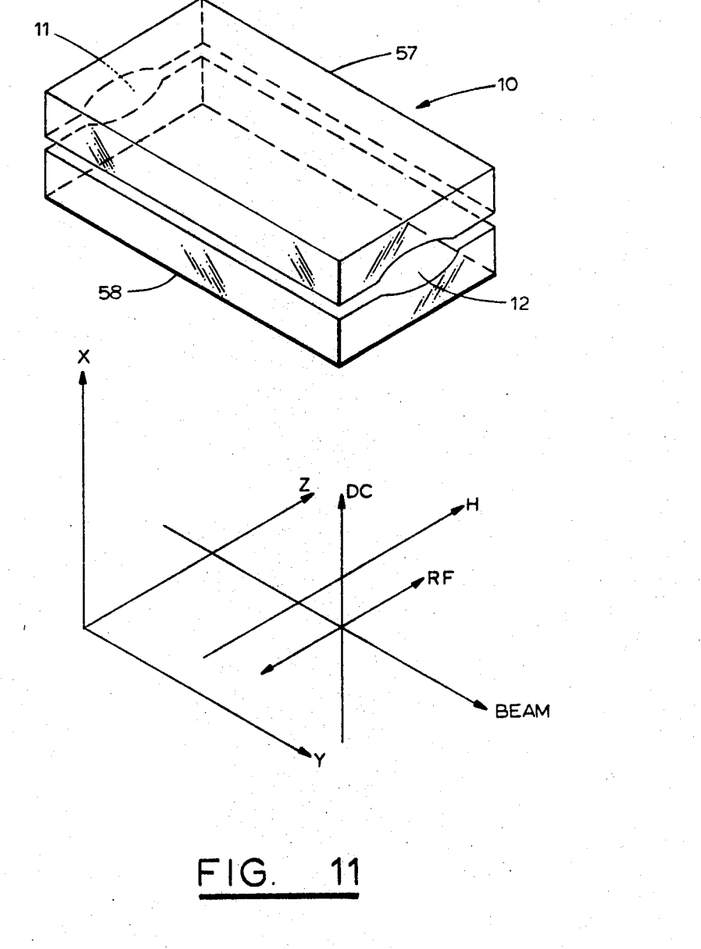
FIG. 11 is a schematic view of an eighth embodiment of our invention.

FIG. 10 depicts an embodiment of our invention operating near the beta-$f$ crossing of the energy levels of the metastable atoms. In this embodiment the direction of the H field is perpendicular to the direction of travel of the atomic beam necessitating the application of a "bucking " DC electric field to cancel the motional electric field generated by the atomic beam cutting the magnetic lines of force. RF cavity 10 is separated into segments 50, 51, 52 and 53 which are electrically insulated from each other by quarter wave joints 54. The operational DC voltage is applied across segments 51 and 53 while the bucking voltage is applied across segments 50 and 52. The respective directions of the H, RF, DC and bucking (E) fields are as shown in FIG. 10. Input 11 and output 12 are divided into insulated segments for application of diserent DC voltages across the segments.

In FIG. 11 we depict an embodiment of our invention useful when dealing with metastable atoms near the beta-$e$ crossing as shown in FIG. 12. Radio frequency cavity 10 operates in the $TM_{010}$ mode on a three dimensional coordinate system as shown in FIG. 11. The beam of metastable atoms is introduced into the cavity at its input 11 and the polarized atoms are obtained at output 12. The RF electric field and the H field are provided in a direction perpendicular to the direction of travel of the atomic beam, while the DC electric field is perpendicular to the H and RF fields and at the same time perpendicular to the direction of travel of the beam. The DC voltage is applied across segments 57 and 58 of cavity 10, which segments are electrically insulated against DC current. The respective directions of the H, DC and RF fields are as depicted in the line diagram in FIG. 11. The DC voltage applied must be sufficient to cancel the voltage induced by the passage of the beam through the lines of magnetic force and at the same time act on the beam in the desired manner.

Obviously many modifications and variations of the present invention are possible in the light of the above teachings. It is, therefore to be understood that within the scope of the appended claims the invention may be practiced otherwise than as specifically described.

What is claimed is:

1. In a device for the selection of metastable one electron atoms or metastable one electron ions with a particular polarization from a group of such particles, the combination comprising:

retainer means for containing radio frequency fields; input means for introducing metastable particles into said retainer means; magnetic means for creating a magnetic field with the retainer means, said magnetic field having a field strength corresponding to that at the energy level crossings for the group of particles; radio frequency means electrically coupled to said retainer means for producing a radio frequency electric field within said retainer means, said radio frequency field having a frequency corresponding to the difference between the alpha energy and the beta energy of said atoms which obtains at the particular magnetic field being used; and a low frequency means for producing a static electric field within said retainer means; whereby those atoms of said group of atoms having a particular polarization are sustained as metastable within said retainer means, and those atoms within said cavity not having such particular polarization are quenched to ground state.

2. The combination as defined in claim 1, wherein: said retainer means comprises a radio frequency cavity having an input and an output; so that a group of metastable particles are introduced at the input and the selected particles are obtained at the output.

3. The combination as defined in claim 2, wherein: said radio frequency cavity is divided into segments which are joined by insulation means which impede low frequency current, but do not impede radio frequency current, and said low frequency voltage means is applied across a pair of oppositely spaced segments.

4. The combination as defined in claim 2 wherein: the segments of said radio frequency cavity are divided into a plurality of parts along the longitudinal axis of said radio frequency cavity which parts are electrically insulated from each other by quarter-wave joints and said low frequency voltage means comprises a plurality of low frequency voltage sources, one of which is applied between each oppositely spaced pair of said segments so that a variable direct current electric field is applied within said radio frequency cavity.

5. The combination as defined in claim 1, including: means for varying the ratio of the low frequency field strength to the radio frequency strength within said retainer means.

References Cited

UNITED STATES PATENTS 3,255,423   6/1966   Ramsey et al. _________ 331—94
3,360,740   12/1967  Lacey _____________ 331—94 X WILLIAM F. LINDQUIST, Primary Examiner